United States Patent [19]
Hodge

[11] 4,341,439
[45] Jul. 27, 1982

[54] OPTICAL FIBER CONNECTOR AND METHOD OF MAKING SAME

[75] Inventor: Malcolm H. Hodge, Claymont, Del.
[73] Assignee: TRW Inc., Elk Grove Village, Ill.
[21] Appl. No.: 81,946
[22] Filed: Oct. 4, 1979
[51] Int. Cl.³ .............................................. G02B 7/26
[52] U.S. Cl. .................................. 350/96.22; 350/320
[58] Field of Search ............... 350/96.15, 96.16, 96.20, 350/96.21, 96.22, 320

[56] References Cited

U.S. PATENT DOCUMENTS

| | | | |
|---|---|---|---|
| 3,825,320 | 7/1974 | Redfern | 350/96.22 |
| 3,951,515 | 4/1976 | Allard | 350/96.22 |
| 4,057,448 | 11/1977 | Miller | 350/96.21 X |
| 4,082,421 | 4/1978 | Auracher et al. | 350/96.22 |
| 4,109,994 | 8/1978 | Chown | 350/96.21 |
| 4,214,809 | 7/1980 | Reh | 350/96.20 |
| 4,225,214 | 9/1980 | Hodge et al. | 350/96.21 |

OTHER PUBLICATIONS

Casler, "Manufacturing Matched Fiber Optical Arrays", *IBM Tech. Discl. Bulletin*, vol. 14, No. 3, Aug. 1971, p. 829.

*Primary Examiner*—John D. Lee
*Attorney, Agent, or Firm*—Neuman, Williams, Anderson & Olson

[57] ABSTRACT

A connector construction of small sectional dimensions comprises a plurality of cylindrical guides preferably formed of glass and having cylindrical surfaces in side-by-side arrangement. The guides define channels having cusp-shaped interstices, adapted to receive optical fibers to be joined in optical-signal transmissive connections. The channel sectional areas are larger than that of fibers to be received therein. The cusps of such channels defined by converging cylindrical guide surfaces function as fiber-aligning tracks whereby fiber ends aligned on a common cusp track may be butted in a desired end-to-end relation.

The glass guide assemblage is subjected to conditions adequate to allow plastic deformation or the formation of bends in opposed guide portions disposed to either side of a straight, central guide portion. The deformation is adequate to force optical fibers inserted in opposed ends of the assemblage to move into predetermined cusp tracks. After desired bend formation, the assemblage is transversely cut in the central portion and the cut guide faces processed, if necessary, to define smooth, mating faces. Optical fibers inserted in the channels of each half which terminate with the connector finished faces may then be aligned and mated in an opening in a wall or the like for purposes of interconnecting optical fibers disposed to either side of such wall.

27 Claims, 20 Drawing Figures

OPTICAL FIBER CONNECTOR AND METHOD OF MAKING SAME

This invention relates to an optical fiber connector, and more particularly pertains to a connector formed of inexpensive cylindrical guides which although formed with low-tolerance dimensional requirements is able to provide efficient optical fiber signal transmissive connections with a minimum of light loss.

The guides may be formed of heated glass rods disposed in a square side-by-side array which are drawn to an extremely small diameter and fused together at tangential points of contact so as to provide close-packed fiber-receiving interstices. Such assemblage when cut transversely provides two connector halves which may be employed in wall openings wherein it is desired to interconnect a large number of optical fibers disposed on opposite sides of such wall in efficient, low-loss light transmissive connections.

The provided invention has particular utility in those applications where wall openings are to be maintained at a minimum size. Thus in submarines where heavy steel, pressure resistant hulls must be penetrated by signal conveying optical fibers, and the maximum diameter opening cannot exceed a few inches, maximum fiber density in each hull opening traversed is an obvious desideratum. The desirability of such maximum density is further emphasized by the tremendous cost attendant the formation of each hull aperture. Thus, the minimizing of the number of apertures is another primary aim further emphasizing the desirability of maximum fiber density in each hull opening.

The prior art has disclosed the use of connectors for connecting a plurality of optical fibers in patents such as Auracher U.S. Pat. No. 4,082,421. In this patent precision holders having tapering bores align optical fibers to be optically connected either in an end-to-end relation, or by means of lenses interposed the fiber ends. Alignment pins and sockets align the two connector halves. In Auracher, however, the density of the fibers in the connectors is low, requiring a large connector sectional area, and in addition precision bores for receiving the fibers are employed. Such structural features are not necessary or present in the connector construction of applicant.

Allard U.S. Pat. No. 3,951,515 discloses an optical fiber connector for use in a submarine hull penetrator employing a fused block of optical fibers in which light passing along the individual fibers is constrained to travel along a nonspreading axial path through the fused optical block made up of an optical core and cladding glass. The connector construction of Allard requires precise alignment between a fiber optic plug inserted in a hull aperture and opposed terminal blocks. Thus, there is a double interface between fiber ends thereby increasing the chance of light loss. Also, there is the disadvantage that the light signal conveyed by the fibers spreads through the cladding sections of the fused block.

Redfern U.S. Pat. No. 3,825,320 is directed to a high pressure optical bulkhead penetrator employing a cylindrical or tapered plug of glass adapted to receive single fibers only. This patent does not disclose the use of multiple channels for guiding a plurality of optical fibers in a high density connector construction.

It is an object of this invention, therefore, to provide a low-cost connector adapted to interconnect the ends of a large plurality of optical fibers in a high density connector construction.

It is another object of this invention to provide a high density connector structure which may be readily formed from inexpensive materials of fabrication and provides reproducible fiber-receiving channel registration.

It is a further object of this invention to provide an optical fiber connector construction which is extremely seaworthy, and readily adaptable for incorporation in a hull penetrator of a submarine while occupying minimum sectional area whereby receiving hull apertures need only be of minimum diameter.

It is another object of this invention to provide a method comprising a series of easily performed steps for forming a high density connector construction which is readily adaptable for incorporation in submarine hull penetrators.

It is yet another object of this invention to provide a method for effecting the simultaneous connection of hundreds of discrete optical fibers housed in a submarine hull penetrator without adversely affecting the sealing ability of such penetrator.

It is yet another object of this invention to provide a high density connector employing channel-to-channel connections in two connector portions which although formed with low tolerance dimensional requirements result in optical fiber light losses of below 1 dB per fiber juncture.

The above and other objects of this invention will become apparent from the following detailed description when read in the light of the accompanying drawing and appended claims.

In one embodiment of the provided invention, aligned glass rods which, by way of example, may be thirty one on each side of a square, are arranged in close packed, tangential relationship. The resulting square of rods which defines nine hundred fiber-receiving channels is heated and drawn while heated so as to attenuate the same, forming a glass guide in which the rods are fused together at their tangential lines of contact. The fused rods define channels having cusp-shaped interstices; each channel is defined by the converging surfaces of four adjacent contiguous rods. The sectional area of each of such channels is adapted to readily receive an optical fiber therein.

The array of fused rods is heated, and bends are formed at spaced end portions disposed to either side of a central longitudinal portion. The rod bends define corresponding bends in the channels which force optical fibers inserted in the opposed ends to be urged into corresponding cusps of each channel. Thus, when opposed optical fibers are threaded through the channels they will meet in the central longitudinal portion of the fused glass rod array whereat they may abut in efficient, optical-signal transmissive connections.

The central longitudinal portion of the fused rod assemblage is then potted in a molding material such as a heat-curable resin, together with parallel alignment tubes disposed adjacent the rod assemblage. Following curing of the molding material, the resulting module is transversely cut at its center thereby defining two planar cut faces. The two separate halves adapted to be employed as optical fiber connector halves then receive individual optical fibers through the entrance ends of the rod portions extending beyond the cured potting resin.

The fibers are inserted into the individual channels until they protrude about 0.25" from the faces of the module half portions. Light-absorbing epoxy resin is then applied to the exposed fiber ends whereafter the fibers are retracted until they protrude approximately 0.05". The retraction of each fiber back into its channel from the cutface end of the connector half in which disposed insures that the fibers adopt the desired "upper cusp position" in the channels in which disposed. The retraction step also serves to pull epoxy painted on the exterior surface of the cut-connector-end and the terminal fiber ends back into the channels, whereafter the epoxy may cure and fix the fibers in position in the channels in the desired cusp and also provide a fluid-tight channel seal.

After the epoxy is cured, the two cut faces of the connector halves are polished. The faces may then be butted with the fiber-containing channels in desired alignment using the tubes which have been molded integrally into the connector halves as alignment means by interfitting such tubes with interconnecting, resilient alignment pins.

For a more complete understanding of this invention reference will now be had to the drawing wherein.

Figure 1:
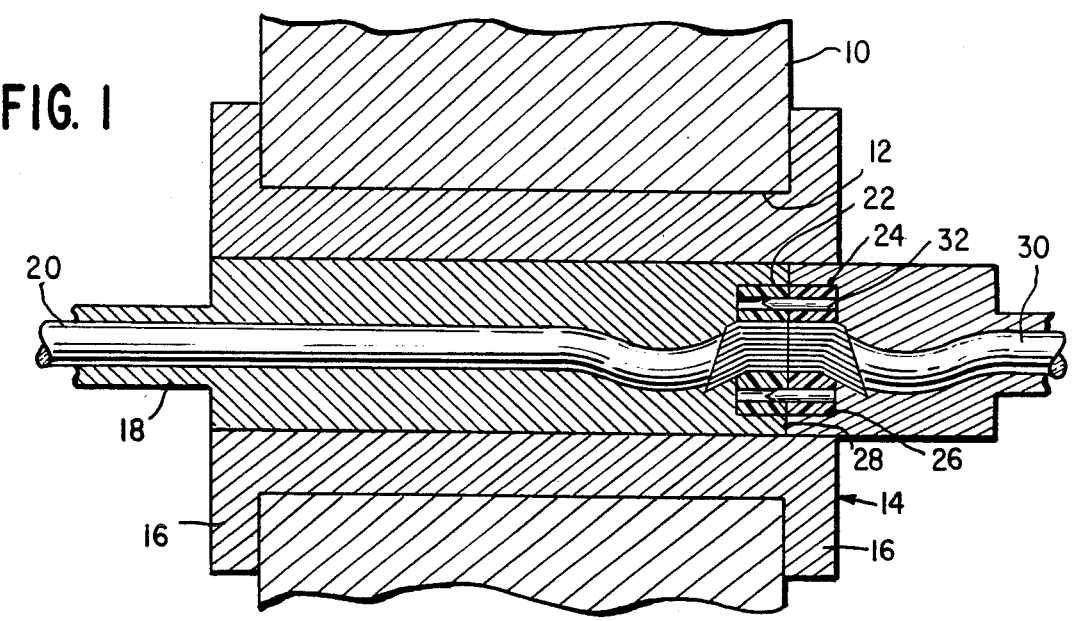
FIG. 1 is a fragmentary sectional view of a submarine hull aperture in which a connector made in accordance with this invention is disposed in a hull penetrator assembly.

Referring now more particularly to FIG. 1, a submarine hull 10 is illustrated having an aperture 12 which is necessarily of extremely small sectional area to preserve the structural integrity of the hull and enable it to withstand tremendous undersea pressures experienced at depths normally encountered on submarine patrol. A penetrator seal assembly 14 flanged at 16 at opposed end portions assists in rendering the hull opening 12 water tight together with concentric seal 18 in which an optical fiber cable 20 extending from the inside of the submarine is disposed. Cable 20 terminates in one half 22 of a connector 24 disposed within the sealing material 18. Connector portion 22 mates with connector portion 26 along a mating line 28. Connector portion 26 is connected to fibers of optical fiber cable 30 and intermates with connector portion 22 with the assistance of alignment pins 32 as will hereinafter be described in greater detail.

In accordance with the invention of this application it is desired to provide a high density connector construction whereby a large number of optical fibers may be connected, allowing penetration of a submarine hull by a large number of fibers which traverse a minimum size hull aperture. Thus, utilizing optical fibers, a large number of signals generated exteriorly of a submarine may be conveyed to the submarine interior, such signals originating with instrumentation disposed on the submarine exterior. As the number of hull openings must be maintained at a minimum to maintain the structural integrity of the submarine and, as each hull aperture entails great manufacturing expense, it is important that maximum signal communication be effected through every available hull aperture.

Thus in accordance with this invention a high density optical fiber connector may be formed from cylindrical guides such as glass rods; the connector is adapted to join optical fibers of approximately 5 mil diameter, the rods preferably being 13 mils in diameter or greater.

Figure 2:
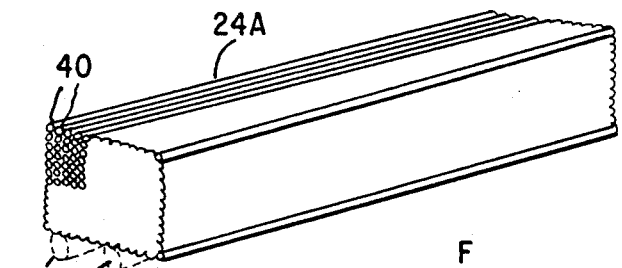
FIG. 2 is a perspective view of a plurality of cylindrical guides arranged in an integral assembly prior to formation of a connector made in accordance with this invention.
Figure 11:
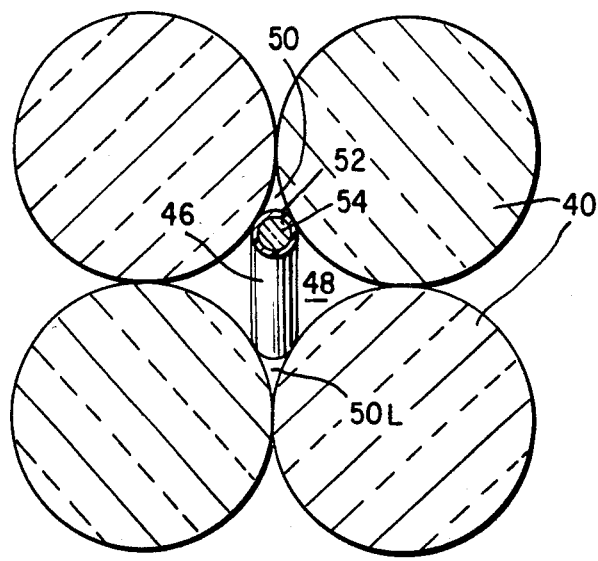
FIG. 11 is a sectional view illustrating an optical fiber aligned in a channel upper cusp as a result of the bend imparted to such fiber by bent guide portions in which disposed.

The assemblage 24A of FIG. 2 may be composed of individual rods 40 arranged in a side-by-side relationship in which the rod centers are vertically and transversely aligned whereby each square of four rods defines in section a channel or passageway having four cusp-shaped interstices as illustrated in FIG. 11 of the drawing. Such array comprises the initial step in the formation of the two half connectors 22 and 26 illustrated in FIG. 1.

The rods 40 may be approximately 15 mils in diameter having been heated and drawn to such diameter from a larger rod size. The rod array 24A of FIG. 2 defines channels for receiving fibers of 5 mil diameter. The illustrated rod array defines a square of fiber-receiving channels thirty on a side for a total of nine hundred. It is apparent that the drawing figures are not drawn to scale. The rod array 24A of FIG. 2 when employing rods of the foregoing dimensions measures approximately 0.465" by 0.465" square. Thus, nine hundred fibers may pass through an opening which is less than one-half inch square in cross-section.

Figure 3:
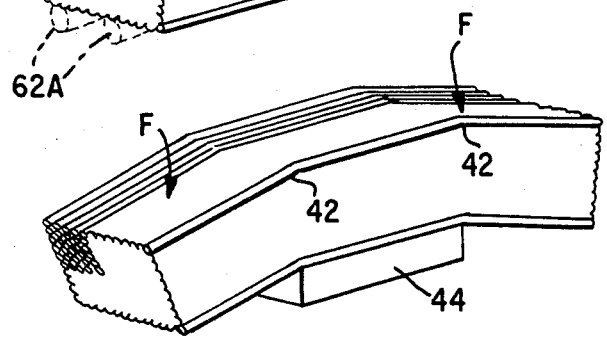
FIG. 3 is a perspective view of the fused glass rod assemblage of FIG. 2 after opposed bends or elbows have been formed therein for purposes of imparting desired bends in the channels defined by the rod assemblage.

After the assemblage 24A of FIG. 2 is formed, it is heated until the rods may be bent as indicated at the bends 42 as by means of forces applied to the opposed assemblage end portions while the central portion rests upon a support platform 44 (see FIG. 3). The bends 42 are formed in the rod assemblages so as to enable the rod channels to correspondingly bend inserted fibers. Thus when fiber 46 is inserted in the end of a channel 48 defined by rods 40 (see FIG. 5), the fiber 46 is urged into an upper cusp 50, as is clearly illustrated in the sectional view of FIG. 11 of the drawing. FIG. 11 depicts four rods 40 in a "square" array. Each fiber 46 in section comprises an outer cladding 52 having a lower refractive index and adapted to minimize light loss as a light signal is conveyed through central core 54.

As disclosed in my co-pending application Ser. No. 968,045 which is a continuation-in-part of my earlier application Ser. No. 838,350, which was in turn a continuation-in-part of my still earlier application Ser. No. 758,106, both of which are now abandoned, six parameters are instrumental in establishing the structure of the channels 48 in each connector 22 and 26 illustrated in FIG. 5 containing the bends 42. The six parameters for rods in a "square" array of FIG. 5 include the length of each bent rod portion 40 and the minimum length Y of the straight midportion necessary to urge fibers such as illustrated fiber 46 to the upper cusp 50 as illustrated in FIG. 11 of the drawing.

Figure 13:
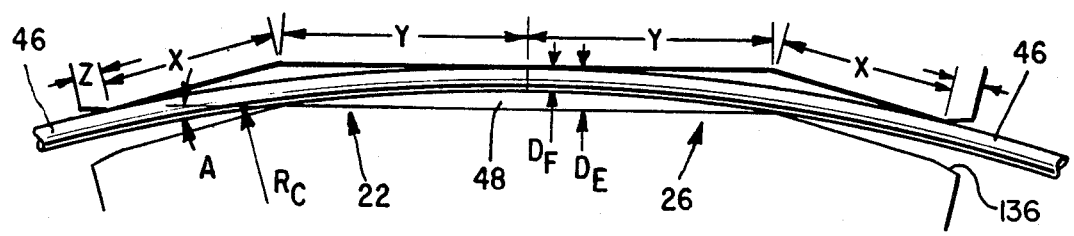
FIG. 13 is a schematic representation of two optical fibers engaging in a light signal transmissive connection in a channel such as are employed in the connector halves of this invention.

Other parameters more clearly seen from FIG. 13 illustrating channels 48 with abutting fibers 46 therein are diameter $D_F$ of the fiber 46; the effective diameter $D_E$ of the channel 48; the angle A which each fiber end makes with the straight midportion of the guide, and the radius of curvature $R_C$ that each fiber is forced to adopt in passing through the guide for disposition of its end within the top cusp 50 of the guide.

As is set forth in my co-pending application Serial No. 968,045 the effective channel diameter $D_E$ for a four cylinder guide illustrated in FIG. 11 is $D_E = 2\{(R_R+R_F) - [(R_R+R_F)^2 - R_R^2]^{\frac{1}{2}}\}$, $R_R$ being the radius of the rods and $R_F$ being the radius of the fibers.

As is also set forth in said co-pending application, the disclosure of which is incorporated by reference in this application, the curvature of the fibers passing through the angularly extending end portions 40 defining channel 48 is defined by the formula $$R_C = \frac{Y^2 + (D_E - D_F) D_E}{2 (D_E - D_F)}.$$

The value for $R_C$ is selected to be significantly greater than the minimum radius of curvature provided by the formula so that the fibers can safely endure curvature without exhibiting static fatigue. The 5 mil fiber "$R_C$" is selected to be no less than two inches. By using the formula for $R_C$, one is able to calculate the minimum length Y of the mid-section of the guide necessary to bring one fiber end into axial alignment within the upper cusp 50 (FIG. 11).

As was also set forth in my co-pending application, the angle A in radians that each end portion of the fiber 46 makes with the straight midportion of the guide is defined by the formula:

$$A = 180 - \cos^{-1}\frac{(X^2 + Y^2)d}{(d^2 + Y^2)X} - \cos^{-1}\frac{2Yd}{d^2 + Y^2} \tag{3}$$

where X represents the length of each angularly extending end portion of the guide, measured from the point at which the end portion joins the straight midportion and to the bottom of the flared mouth 136 at the open end of the end portion.

For guides whose channel slack, i.d., $D_E - D_F$, is small as compared to the length of the channel, as is the case with most guides, the above formula may be simplified to:

$$A = \frac{(X + Y)^2 (D_E - D_F)}{XY^2} \tag{4}$$

For guides in which the channel slack, $D_E - D_F$ approaches approximately 10% of the length of the channel, the formula (3) should be used.

The total length of the guide, measured in a longitudinal direction from end to end, is denoted by $G_L$ and is defined by the formula:

$$G_L = 2Z \cos A + 2X \cos A + 2Y \tag{5}$$

where Z represents the depth of the flared mouth at each end of the channel. For guides not utilizing a flared mouth, and hence where $Z = 0$, formula (5) becomes:

$$G_L = 2X \cos A + 2Y \tag{6}$$

Thus, no part of this invention is directed per se to the guide bend which is provided for imparting the necessary curvature to the optical fibers for purposes of effecting a bending of the same so as to urge the fiber end portions which would normally abut in a signal transmissive connection into a desired cusp of a guide channel. The invention of this application is directed to the formation of a high density two-piece connector which substantially instantaneously and repeatedly effects a good signal transmissive connection between large numbers of optical fibers disposed in high density connector portions.

Figure 4:
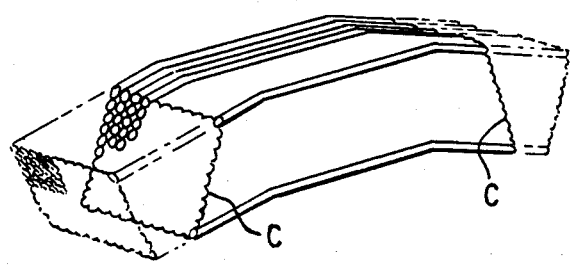
FIG. 4 is a perspective view of the rod assemblage of FIG. 3 after oblique cuts have been made in opposed end portions for purposes of providing an enlarged effective opening area in each channel for reception of optical fibers to be received therein.
Figure 4A:
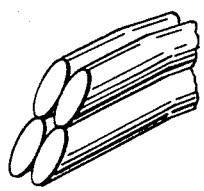
FIG. 4A is a schematic representation of four contiguous rods of the assemblage of FIG. 4 after the oblique cut has been made, illustrating the nature of the channel enlargement for fiber reception.

After the desired angularity of the two bends 42 has been formed in the rod assemblage in the manner illustrated in FIG. 3, opposed end portions of the rods are preferably cut along planes C in the manner illustrated in FIG. 4 so as to exaggerate the effective fiber-receiving end opening of each channel in the manner schematically illustrated in FIG. 4A. The oblique cuts C illustrated in solid lines in FIG. 4 in the opposed assemblage end portions exaggerates the end opening of each channel 48 in the rod assemblage to facilitate threading into such openings of optical fibers 46 to be connected in a light transmissive connection in a ready manner in a subsequent step to be discussed hereinafter.

Figure 6:
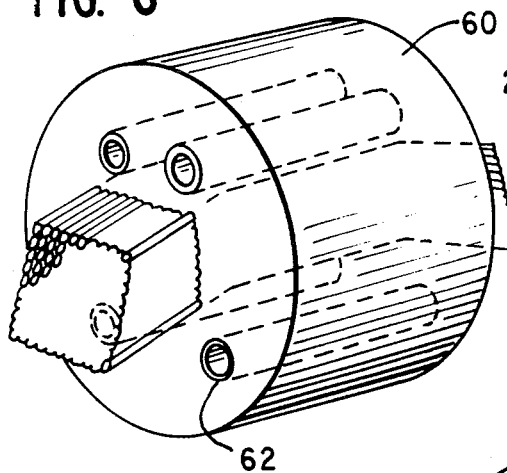
FIG. 6 is a perspective view of the rod assemblage of FIG. 4 after the same has been potted together with alignment tubes in a curable potting compound such as a heat curable resin.

After the desired end cuts C are made in the manner of FIG. 4, the resulting glass rod assemblage is molded into a larger module with molding compound as to form module 60 of FIG. 6. Simultaneously molded as an integral unit into the module 60 are guide tubes 62. The material employed for forming the body of the module 60 in which the rod assemblage 24A and guide tubes 62 are embedded in parallel relationship is preferably an injection moldable plastic such as nylon, styrene or a castable resin such as an epoxy resin.

Figure 7:
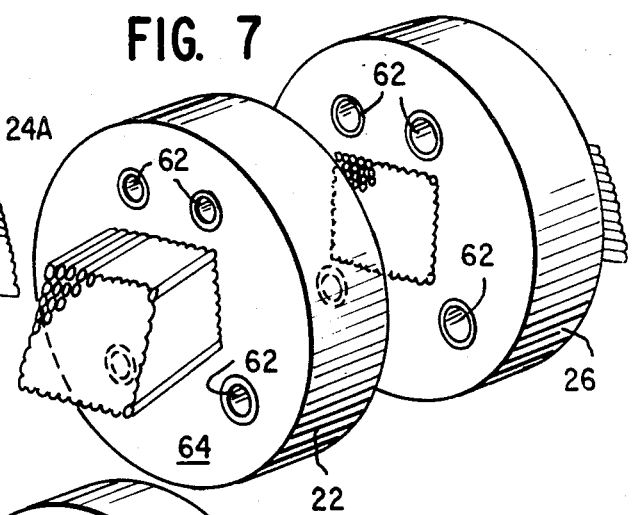
FIG. 7 illustrates the module of FIG. 6 after the same has been transversely cut.

After the matrix in which the glass rod assemblage and guide tubes 62 are molded has cured, the same is transversely cut in the manner illustrated in FIG. 7 so as to form two connector halves 22 and 26. Optical fibers 46 to be connected in optical signal transmissive connections are then threaded through the channels 48 of each half 22 and 26 formed from the original module 60, in the manner illustrated in FIG. 8. It is most apparent from FIG. 9 that each glass fiber 46 is threaded through each channel 48 of each connector half until terminal end T of each fiber 46 extends beyond surface 64. The fibers should preferably extend approximately 0.025" beyond terminal surface 64 of each connector half 22 and 26. The extending terminal ends T of the fibers and adjacent connector surfaces are coated with a curable, light-absorbing epoxy resin composition 66, whereafter the fibers 46 are withdrawn into the channels 48 in each connector half 26 and 22 until fiber terminal ends T extend preferably approximately 0.005" from face 64 of each connector half. The epoxy 66 is then allowed to harden whereafter the faces 64 are polished, removing any terminal fiber portions T from the face together with any epoxy resin that remained on the face 64. The resulting faces 46 are planar whereby fibers 46 disposed in corresponding channels of the connector halves 24 will engage in a desired optical signal transmissive connection when the two faces 64 of the halves are brought into aligned position in which corresponding channel-defining rods are aligned.

Figure 8:
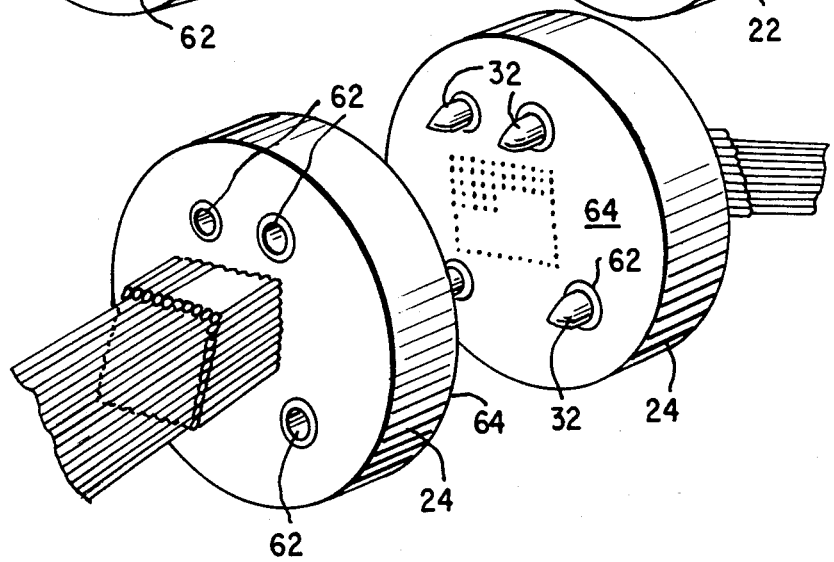
FIG. 8 is a perspective view of the module halves of FIG. 7 after optical fibers have been threaded into channels of the rod assemblages of each half.

The aligning of the finished halves 22 and 26 is effected by means of resilient pins 32 which are inserted in a frictional interlock within the hollow aligning tubes 62 embedded in each connector half 22 and 26. FIG. 8 illustrates connecting plugs 32 in place prior to an interconnection between the two connector halves.

Figure 9:
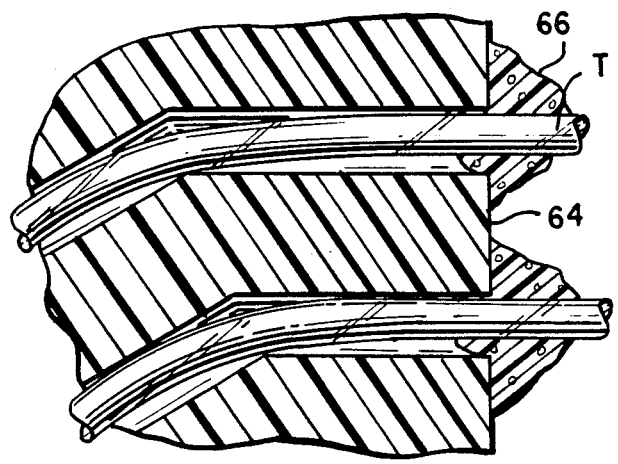
FIG. 9 is a fragmentary view illustrated on a greatly enlarged scale, of two channels of the glass rod assemblages in the connectors of FIG. 8 after exposed optical fiber ends have been coated with an epoxy resin.
Figure 10:
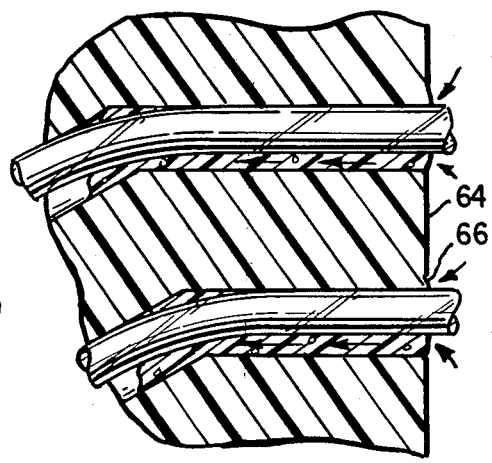
FIG. 10 is a view similar to FIG. 9 after the optical fibers illustrated in FIG. 9 have been partially retracted into the channels, simultaneously drawing into the channels a portion of the epoxy resin initially coated on the exterior of the connector cut face.

It will be noted from a comparison of FIGS. 9 and 10 of the drawing that upon retraction of the fibers 46 into the channel passageways, desired disposition of each fiber in the upper-cusp position of FIG. 11 is assured and simultaneously a quantity of the uncured resin 66 is forced by the action of the retracting fibers 46 to enter the channels in the manner illustrated in FIG. 10. Any extending portions of the fibers are subsequently ground off so as to define a smooth finished surface in the manner above indicated. The quantity of surface 64 which is ground down is immaterial so long as the y-defining portion of the resulting connector half 22 or 26 is adequate to locate a filament portion in an upper cusp portion 50 during alignment of fibers when the two connector halves are brought together for purposes of effecting light transmissive connections.

Following formation of the connector halves, the same may be employed in the manner illustrated in FIG. 1 for purposes of allowing light-transmissive connections to be effected between a large number of optical fibers disposed exteriorly and interiorly of a submarine hull through a small opening in such submarine hull. The optic fibers transmit signals from instrumentation disposed on the exterior of the sub hull into desired receiving apparatus disposed on the hull interior for purposes of determining condition on the hull exterior such as pressure, proximity to adjacent objects, etc.

Although the foregoing description has been specific with respect to the use of glass guides formed by drawing heated rods while in the plastic condition the foregoing description would suggest the use of other materials of fabrication for the provided guide of cylindrical surfaces. Thus various hard plastics not necessarily possessing thermoplastic characteristics and which need not necessarily be drawn whole hot so as to form an integral unit such as the rod assemblage 24A of FIG. 2 may be employed. The rod assemblages of such plastic or even of the glass rods themselves may be held together by means of an external, encompassing, binding means such as a resilient strap or the like which may be employed for maintaining the rods together although it is believed apparent that the advantages of glass are desired in the provided connector. Glass is a readily available material of composition and is relative cheap. Glass has the unique property of being "fire polished" that is, forming hard, smooth outer surfaces when subjected to heat such as to plasticize the same, thereby upon drawing the same in a plastic state a smooth outer surface is provided. Such smooth surfaces are both hard and yet do not abrade the delicate cladding material of optical fibers to be connected in an optical signal transmissive junction.

As a modification to the foregoing method of formation of the connector halves, the guide tubes 62 may be drawn simultaneously and formed integrally with the rod assemblage thus assuring a more accurate alignment therewith. Thus tubes 62A of FIG. 2 (illustrated in phantom) are integrally drawn with the rods 40 of assemblage 24A and formed therewith, resulting in accurate alignment of the two resulting connector halves joined by means of the interfitting resilient pins 32.

Figure 5:
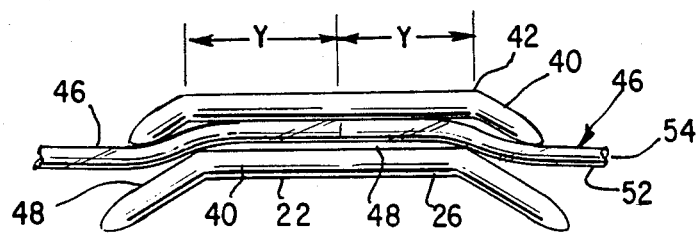
FIG. 5 is a schematic representation illustrating the manner whereby opposed optical fiber ends may meet in an optical fiber transmissive connection in the center of each channel of the rod assemblage illustrated in FIGS. 1 through 4.

It will be noted from FIG. 5 that the ends of the glass rods 40 into which the fibers 46 are threaded are tapered. This may result from a fire polishing of the rod assemblages following the oblique cutting action illustrated in FIG. 4 of the drawing. Such fire polishing further facilitates the insertion of the optical fibers 46 into the channels defined by the rods. Alternative means for enlarging the channel ends so as to facilitate threading of optic fibers therethrough comprises the use of etching solutions or hot dowels forming conical enlargements. It is thus seen that although the receiving channels defined by the guide-forming rods 40 of the provided invention are somewhat larger than the fibers received therein, because of the precise disposition of each fiber end in an aligning track or cusp, desired fiber end-to-end connection is effected in the manner illustrated in FIG. 13.

Figure 12:
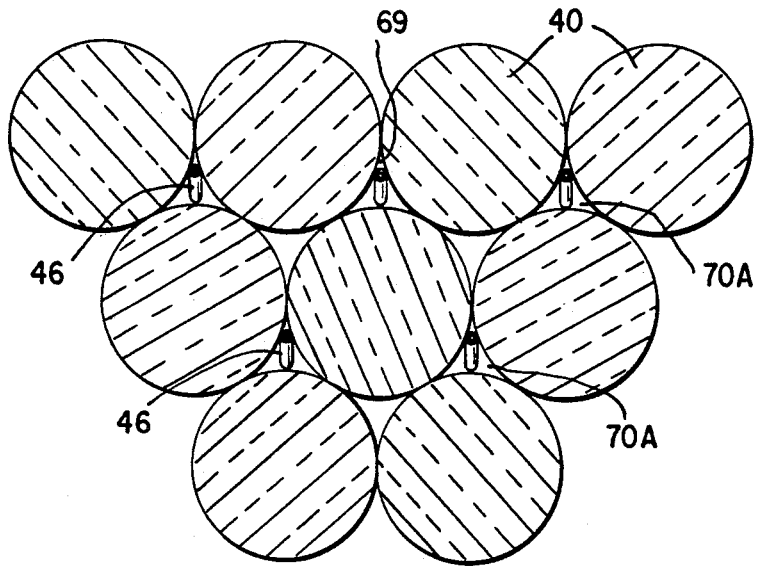
FIG. 12 is a view similar to that of FIG. 11 illustrating cylindrical guides arranged in a regular triangular array.

Also, although the guide rod alignments are square in the manner illustrated in the drawing of FIGS. 1 through 4, it is believed apparent that other rod arrangements such as that illustrated in FIG. 12 could work to advantage. The "square" rod arrangement has the advantage that lower cusp 50L (FIG. 11) directly opposite the aligning cusp 50 into which the fiber 46 is urged for connection purposes facilitates the centering operation as both the lower and upper fiber portions are centered on directly opposed converging cusp-defining portions of the rods which is not the case with tricuspid channels 70A illustrated in FIG. 12 of the drawing. In the triangularly packed array of FIG. 12 only alternate horizontal channel rows are utilized. In the channels 70A employed, the fibers are desirably aligned by two converging guide rod surfaces defining an upper cusp 69 into which the fiber ends are urged and which provide the necessary preciseness of fiber location as illustrated.

Thus, when a triangular array is potted and transversely cut, fiber ends located in cusps 69 of channels 70A will be precisely butted in desired signal transmissive connections upon bringing the finished faces together in the manner of FIG. 8.

Figure 14:
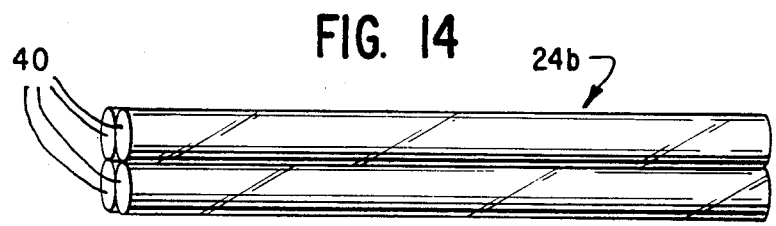
FIG. 14 is a perspective view similar to FIG. 2 illustrating four cylindrical guides adapted to be employed in a connector for joining the ends of two optical fibers in a signal transmissive connection.
Figure 18:
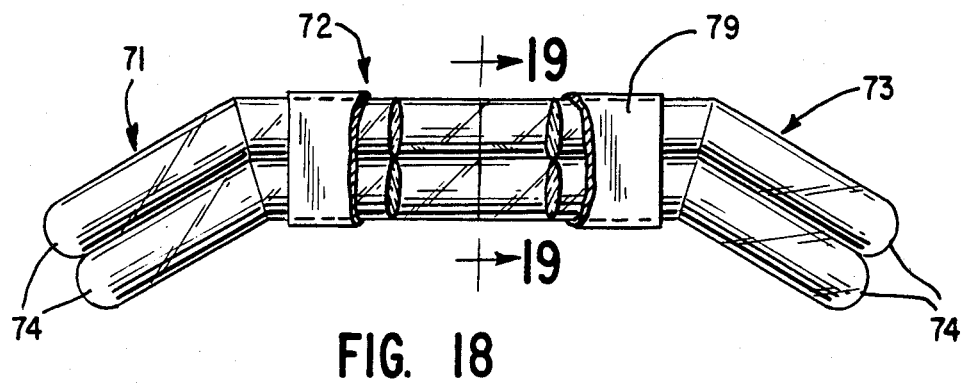
FIG. 18 is a side elevational view partly broken away illustrating the manner whereby the cleaved ends of the two connectors halves illustrated in FIG. 16 may be joined in an abutting relationship within the joining tube illustrated in FIG. 17.

The foregoing description has been specific to high density connectors adapted to simultaneously connect a large number of optical fibers. It is apparent from the foregoing that certain structural features and attendant advantages may be incorporated in single fiber connectors. A two piece single fiber connector is illustrated at 72 in FIG. 18. The single fiber connector is of substantially the same structure as is illustrated in FIG. 5 and includes half portions 71-73 having fire polished ends 74. Portions 71, 73 of the connector 72 are formed of fused rods 40 initially arranged in square array 24b of FIG. 14 which may be heated and bent in the manner above discussed with respect to the rod assemblage of FIG. 2. Similar bends 42b may thus be formed in the assemblage 24b in the manner illustrated in FIG. 15.

Figures 15, 16:
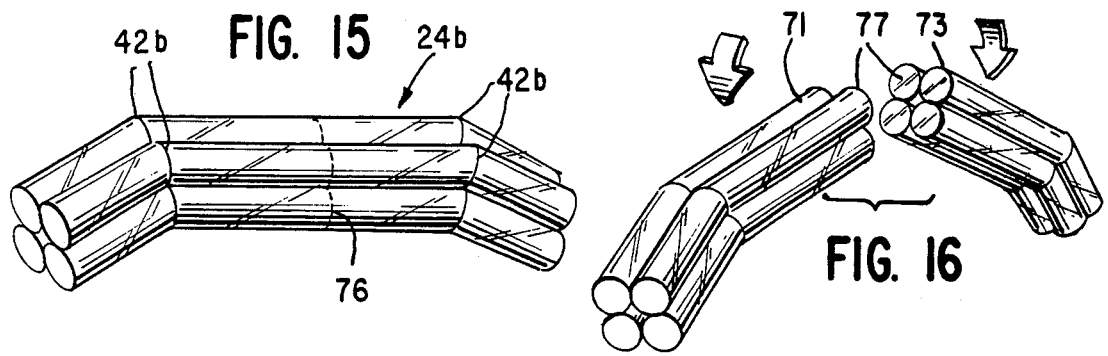
FIG. 15 is a perspective view of the rod assemblage of FIG. 14 after opposed bends have been formed therein for purposes of imparting desired bends in the interior channel thereof.
FIG. 16 is a perspective view illustrating the manner whereby the assemblage of FIG. 15 may be split into two half portions following cleaving of the assemblage of FIG. 15 along score lines.

Score lines 76 are then formed in the center of the bent assemblage 24b of FIG. 15 whereafter the assemblage may be cleanly cleaved into the two half portions 71, 73 of FIG. 16. The fire polished ends 74 of FIG. 18 may be formed in any of the stages of connector formation illustrated in FIGS. 14 through 16. Optical fibers such as the fibers 46 illustrated in the figures of the drawing above discussed, may then be inserted in the entrance ends of each connector half portion 71, 73 defined by the rounded rod ends 74 until they extend beyond planar faces 77 of the connector halves 71, 73. The epoxy paste is then applied to the planar faces 77 in the manner illustrated in FIG. 9 whereafter the optical fibers are retracted in the manner of FIG. 10 after the hardenable epoxy is allowed to set, any epoxy disposed on the planar surfaces 77 of the connector halves is then removed together with any glass fiber extending beyond such faces, exteriorly of the interstitial passageways of the halves in which disposed.

Figures 17, 19:
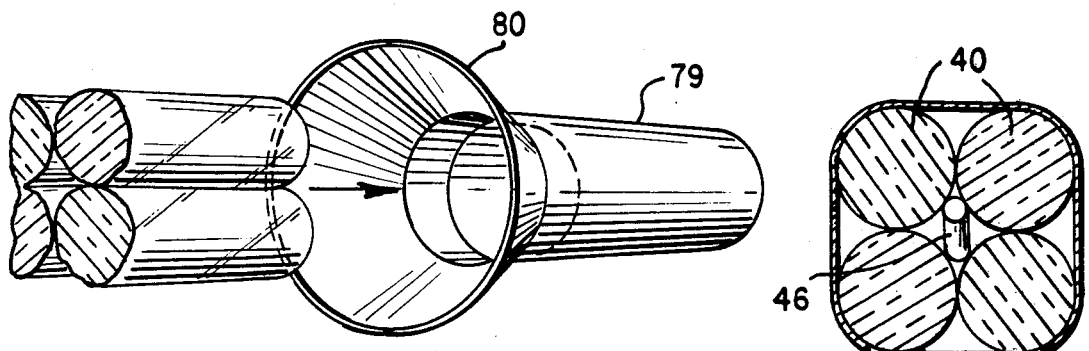
FIG. 17 is a fragmentary perspective view illustrating the manner whereby the planar end of one of the connector half portions of FIG. 16 may be guided into one end of a joining tube prior to insertion of a second cleaved end for purposes of effecting an abutting engagement therebetween.
FIG. 19 is a sectional view taken along line 19—19 of FIG. 18.

For purposes of joining the connector halves 71, 73 the same are preferably inserted in opposed ends of a half joining-and-receiving tube such as a tube 79 of FIG. 17. Tube 79 may be formed of thin gauge beryllium copper metal which has a desired property of lubricity in addition to possessing a desired "stretch" or "give" enabling the cross-section of the tube to enlarge as each cleaved guide half is inserted therein. To facilitate insertion of each connector half 71, 73 into tube 79 a discrete funnel-like entranceway 80 may be employed at the ends of the tube in the manner illustrated in FIG. 17. As a result, the connector-resilient tube assemblage will have a cross-section as illustrated in FIG. 19 after the planar, polished ends 77 of the connector halves 71, 73 have been received in and abut within the interior of tube 79 in the manner illustrated in FIG. 18. The determination of the proper size relationship between the connector halves and a stretchable tube such as tube 79 is believed to be within the skill of the person familiar with connectors of this type.

It is also believed apparent that in the single fiber connections utilizing the guide halves 71, 73 of FIG. 16 it is not necessary to effect a permanent connection between the fiber ends and the four-rod connector halves, but rather the two connector halves may engage from opposed sides of a wall in the interconnecting sleeve or coupler tube 79 without the necessity of effecting a permanent fiber-guide connection. Such a connection without the use of a setting resin or the like would, of course, be employed in those installations in which a temporary fiber connection intended to be eventually disconnected or replaced is employed.

In addition to a thin gauge copper beryllium shell a large variety of elastomeric materials are also suitable for use as a coupler-retainer of the two guide halves. It is also apparent that index matching gels and liquids may be employed at the interface between the two connector halves to minimize light loss. If a permanent splice is intended, an appropriate hardenable resin may be interposed the mating faces of the connector halves 71, 73 prior to abutting the same within the connector shell such as stretchable tube 79. It is contemplated that the single fiber connector construction may be sold with fire-polished ends in the bent end and scored condition illustrated in FIG. 15. A customer may then employ the integral connector or himself snap the halves apart for a desired use application.

It is apparent from the foregoing that a number of modifications may be made in the foregoing constructions described in detail which will remain within the ambit of the invention disclosed. Accordingly, this invention is to be limited only by the scope of the appended claims.

What is claimed is:

1. A connector element for mating with a like connector element whereby the ends of optical fibers housed in said elements are engaged in light-transmissive connections, comprising a plurality of cylindrical surfaces disposed in parallel tangential relation in an array with the axes of generation thereof in horizontal and vertical alignment; said surfaces defining a plurality of fiber-receiving channels having cusp-shaped interstices; said cylindrical surfaces being formed intermediate the ends thereof in such manner whereby an optical fiber inserted into a first end of each of said channels is centered therein by a channel-defining centering cusp adjacent said first end and defined by two converging cylindrical surfaces, and is disposed in a centering cusp of said channels oppositely disposed to said centering cusp adjacent said first channel end, at a second end thereof.

2. A high density connector element for mating with a like high density connector element comprising a plurality of cylindrical surfaces arranged in parallel tangential relation; said surfaces defining a plurality of fiber receiving channels having cusp-shaped interstices;

said cylindrical surfaces being formed intermediate the ends thereof in such manner whereby optical fibers inserted into first ends of said channels are quidingly bent into a predetermined portion of said channels comprising aligning cusps at second ends of said channels; said second ends of said channels defining a connector element mating face for mating with a mating face of a like connector element.

3. The connector element of claims 1 or 2 in further combination with a second plurality of cylindrical surfaces of the same construction as the plurality of claims 1 or 2 respectively, and means connected to each of said plurality of cylindrical surfaces for aligning corresponding second channel ends of said pluralities in end-to-end relation.

4. The combination of claim 3 in which optical fibers are disposed in said fiber-receiving channels of each plurality of cylindrical surfaces; said fibers having ends terminating with the ends of the channels in which disposed at said second channel ends.

5. The connector element of claim 1 or 2 in which said cylindrical surfaces are formed by glass rods drawn while plastic and comprise smooth, fire-polished surfaces.

6. The connector element of claim 5 in which said glass rods are fused together.

7. The connector element of claim 1 or 2 in which optical fibers are disposed in corresponding cusps of the cylindrical surface pluralities with fiber ends terminating with the second ends of said channels, and hardenable light-absorbing epoxy secures said optical fiber ends in fixed position in each of said surface pluralities relative to said channel second ends.

8. The connector element of claim 1 or 2 in which said first ends of said channels are formed by obliquely cutting end portions of said cylindrical surfaces whereby the distal ends of said channels have larger effective openings than that defined by a channel section formed at right angles to the longitudinal axes of said channels, and insertion of optical fibers into said channels is facilitated.

9. The connector element of claim 1 or 2 in which the cross-section of each of said fiber-receiving channels is larger than the cross-sections of optical fibers received therein whereby said fibers are readily received therein and movable transversely to the channel axes, and in which each of said channels comprises two portions angularly disposed to each other.

10. The connector element of claim 1 or 2 in which the end portions of said cylindrical surfaces defining said channel second ends are axially disposed and of sufficient length whereby end portions of optical fibers terminating with the fiber-receiving channel second ends are axially disposed.

11. A connector for effecting optical connections between adjacent ends of optical fibers, the combination comprising discrete first and second housings; optical fibers to be joined disposed in said housings, each of said housings comprising a plurality of parallel cylinders in tangential engagement defining fiber-receiving channels having cusp-shaped interstices; the axes of said cylinders being bent intermediate the ends thereof whereby said optical fibers inserted in first receiving ends of said channels of said first and second housings are urged into corresponding interstices of corresponding channels; said fibers terminating with the channel-defining cylinders at second connecting ends of said channels; said first and second housings being of precisely the same configuration at said second ends whereby fibers disposed in corresponding channels of said housings engage in optical signal transmissive connections when corresponding channel second ends of said first and second housings engage in a face-to-face connection.

12. The connector of claim 11 in which each housing is disposed in a wall opening whereby optical communication between optical fibers disposed on opposite sides of the wall opening is effected between said housings in face-to-face connection.

13. The connector of claim 12 in which said connector is disposed in an opening in a submarine hull and is in combination with sealing means for increasing the sealing pressure for sealing such opening with increased submarine depth.

14. In an assembly for enabling optical fibers to traverse a submarine hull aperture, the combination comprising sealing means disposed in said aperture for rendering said aperture fluid-tight at high hydraulic pressures normally encountered on submarine patrol; an optical fiber connector disposed in said sealing means comprising a plurality of cylindrical surfaces in parallel tangential relation; said surfaces defining parallel channels having cusp-shaped interstices; said cylindrical surfaces being formed intermediate the ends thereof in such manner whereby optical fibers inserted into first ends of said channels are located therein by at least one channel-defining cusp defined by two converging cylindrical surfaces and disposed in predetermined portions of such channels at second ends of said channels.

15. In an assembly for enabling optical fibers to traverse a submarine hull aperture, the combination comprising sealing means disposed in said aperture for rendering said aperture fluid-tight at high hydraulic pressures normally encountered on submarine patrol; an optical fiber connector disposed in said sealing means comprising a first plurality of cylindrical surfaces in parallel tangential relation; said surfaces defining parallel channels having cusp-shaped interstices; said cylindrical surfaces being formed intermediate the ends thereof in such manner whereby optical fibers inserted into first ends of said channels are located therein by at least one channel-defining cusp defined by two converging cylindrical surfaces and disposed in predetermined cusp portions of said channels at second ends of said channels; a second plurality of cylindrical surfaces substantially the same as said first plurality and connected thereto; said second plurality being disposed exteriorly of said aperture and enveloped in sealing means engaging said sealing means disposed in said aperture.

16. In a method of forming a high density connector for simultaneously effecting optical signal transmissive connections between a plurality of optical fibers; the steps comprising arranging a plurality of rods rendered plastic while hot in side-by-side relation; heating and drawing the rods while hot so as to form attenuated rods fused together at contacting rod portions; said fused rods defining channels having cusp-shaped interstices extending the length of said rods; said channels having opposed entrance ends and having effective diameters greater than the fiber diameters so as to readily receive optical fibers to be connected; forming opposed portions of said fused rods joined to central longitudinal portions of said rods whereby optical fibers inserted in said entrances and traversing said formed portions are urged into corresponding aligning cusps of said channels of said central longitudinal rod portions, and transversely cutting said fused rods at said central longitudinal portions so as to form two connector portions.

17. The method of claim 16 in which said rods are formed of glass and the surfaces thereof are fire polished in the course of said drawing step.

18. The method of claim 16 in combination with the steps of inserting optical fibers in opposed entrance ends of said connector portions until distal fiber ends extend beyond the cut faces of said connector portions; coating the distal portions of said fibers with a hardenable material and retracting extending distal fiber ends into said connector portions so as to allow at least a short fiber length to remain exteriorly of said channel beyond said cut faces.

19. The method of claim 18 in combination with the steps of allowing the hardenable material to harden, and removing such hardenable material and said fiber lengths disposed exteriorly of said channels whereby said cut faces are rendered planar.

20. The method of claim 18 in which said hardenable material comprises a light-absorbing epoxy resin.

21. The method of claim 18 in which the step of fiber retraction simultaneously retracts a portion of the hardenable material disposed exteriorly of said channels into the channel interiors.

22. The method of claim 16 in which the rods are disposed in an arrangement in which the rod axes are vertically and horizontally aligned; said optical fibers being centered in first channel cusps prior to traversing said formed rod portions and being urged into second channel cusps following traversing of said formed rod portions.

23. The method of claim 16 in combination with the steps of embedding said central longitudinal rod portions of said fused rods in a curable potting material so as to form a module prior to cutting said rods while disposed in said potting material.

24. The method of claim 16 in which at least the channel portions intermediate the opposed entrance portions are embedded in a matrix of a curable potting compound which is cured, in combination with the step of cutting the rods transversely to the length thereof to form two connector portions whereafter optical fibers are inserted in the entrance ends of the channels of the connector portions until extending beyond the cut faces of the connector portions; painting said optical fiber portions extending beyond the cut faces with a hardenable compound for securing said fibers in said connector channels; retracting said fibers into said channels whereby short lengths thereof extend from the channels beyond the cut faces and hardenable material disposed exteriorly of said channels is retracted into said channels; curing said hardenable compound, and removing said fiber short lengths disposed beyond said cut faces and said hardenable compound disposed on said cut faces so as to form planar connector mating surfaces adapted to mate with each other.

25. A method of forming a high density connector for simultaneously effecting optical signal transmissive connections between a plurality of optical fibers, the steps comprising arranging a plurality of elongate glass guides having cylindrical surfaces in side-by-side relation; arranging a tubular guide in tangential parallel engagement with said plurality; simultaneously heating and drawing said glass guides and tubular guide while hot so as to form attenuated glass guides fused at contacting glass guide portions and fused to said tubular guide; said guides defining open-ended channels having cusp-shaped interstices; forming spaced portions of said guides whereby optical fibers inserted in the open ends of said channels are urged into corresponding interstices of central longitudinal guide portions for fiber aligning purposes; and cutting said tubular guide and said guides in said central longitudinal portions so as to form two connector portions; each central longitudinal portion of each of said connector portions being of adequate length to align in the cusp-shaped interstices thereof fibers inserted into the open ends of the channels.

26. A connector for effecting optical connections between ends of optical fibers comprising discrete first and second connector elements, each of said elements comprising a plurality of parallel cylinders in tangential engagement and defining fiber-receiving passageways having cusp-shaped interstices; said passageways of each connector element extending between first ends in which optical fibers are readily received and second ends which are axially disposed and terminate in substantially the same plane; each of said passageways being non-linear and of such configuration that optical fibers inserted in first passageway ends are guidingly bent into fiber aligning cusps in axial alignment at said second ends of said passageways; and means for aligning corresponding passageway second ends of said connector elements in face-to-face relation whereby optical fibers disposed in and terminating with said passageways are in efficient light-transmissive engagement.

27. The connector of claim 26 in combination with optical fibers in each of said passageways; the effective fiber-receiving diameter of each of said passageways being larger than the diameter of the optical fiber received therein; said fibers traversing the passageway effective diameters in passing from said passageway first ends to said passageway second ends.

* * * * *